US009739682B2

(12) United States Patent
Schoonover et al.

(10) Patent No.: US 9,739,682 B2
(45) Date of Patent: Aug. 22, 2017

(54) VALVE ASSEMBLY CALIBRATION

(71) Applicant: Dresser, Inc., Addison, TX (US)

(72) Inventors: Larry Gene Schoonover, Falmouth, MA (US); Justin Scott Shriver, Newton, MA (US)

(73) Assignee: Dresser, Inc., Addison, TX (US)

( * ) Notice: Subject to any disclaimer, the term of this patent is extended or adjusted under 35 U.S.C. 154(b) by 162 days.

(21) Appl. No.: 14/703,494

(22) Filed: May 4, 2015

(65) Prior Publication Data

US 2016/0327181 A1 Nov. 10, 2016

(51) Int. Cl.
*F16K 37/00* (2006.01)
*G01L 27/00* (2006.01)

(52) U.S. Cl.
CPC ........ *G01L 27/005* (2013.01); *F16K 37/0083* (2013.01)

(58) Field of Classification Search
CPC . G01L 27/005; F16K 37/0041; F16K 37/0083
See application file for complete search history.

(56) References Cited

U.S. PATENT DOCUMENTS

| | | | | |
|---|---|---|---|---|
| 5,406,920 A * | 4/1995 | Murata | .................. | F02D 11/10 123/399 |
| 5,431,182 A * | 7/1995 | Brown | ..................... | G05B 6/05 137/487.5 |
| 5,518,015 A * | 5/1996 | Berget | ..................... | F16K 31/04 137/1 |
| 5,558,115 A * | 9/1996 | Lenz | ...................... | G05D 7/005 137/486 |
| 5,848,609 A * | 12/1998 | Marchesseault | ....... | G05B 19/19 137/624.11 |
| 5,884,894 A * | 3/1999 | Smith | ...................... | F15B 9/09 137/625.64 |
| 6,155,283 A * | 12/2000 | Hansen | ................ | G05B 13/042 137/1 |
| 6,267,349 B1 * | 7/2001 | Gomes | .................. | F16K 31/408 251/30.04 |
| 6,276,385 B1 * | 8/2001 | Gassman | ............... | G05B 19/19 137/1 |
| 6,279,870 B1 * | 8/2001 | Welz, Jr. | ............. | F16K 27/0218 251/129.04 |
| 6,453,261 B2 * | 9/2002 | Boger | ..................... | F15B 5/006 702/138 |
| 6,664,752 B2 * | 12/2003 | Kanayama | ........... | G05B 19/311 318/560 |
| 8,321,059 B2 | 11/2012 | Carter et al. | | |

(Continued)

*Primary Examiner* — Natalie Huls
(74) *Attorney, Agent, or Firm* — Paul Frank + Collins P.C.

(57) ABSTRACT

A method for correcting calibration of a closure member on a valve assembly. The method can include comparing a calculated value to an expected value, each relating to a position of a closure member of the valve assembly relative to a seat of the valve assembly, the calculated value being calculated using a calibration variable and an input value corresponding to a measured position of the closure member. The method can also include identifying a deviation between the calculated value and the expected value. The method can further include changing the calibration variable from a first value to a second value in response to the deviation, the second value equating the calculated value at the input value with the expected value for the position.

14 Claims, 5 Drawing Sheets

(56) References Cited

U.S. PATENT DOCUMENTS

| | | | |
|---|---|---|---|
| 2004/0154466 A1* | 8/2004 | Gethmann | F16K 37/0008 92/5 R |
| 2006/0016183 A1* | 1/2006 | Hoffmann | F16K 37/0041 60/407 |
| 2010/0179699 A1* | 7/2010 | Kresse | F15B 19/002 700/282 |
| 2011/0001070 A1* | 1/2011 | Wilke | F16K 31/1262 251/129.03 |
| 2011/0048556 A1* | 3/2011 | Carter | F16K 31/122 137/559 |
| 2013/0103209 A1* | 4/2013 | Beck | G05D 7/0635 700/282 |
| 2014/0102549 A1* | 4/2014 | Okuda | F15B 5/006 137/82 |

* cited by examiner

VALVE ASSEMBLY CALIBRATION

BACKGROUND

The subject matter disclosed herein relates generally to process control systems.

Flow controls and process devices can be used on process lines that transfer and distribute materials (e.g., gas and liquid) in the chemical industry, refining industry, oil & gas recovery industry, and the like. Valve assemblies are a type of process device that can regulate a flow of these materials. These process devices can include a pneumatic actuator that couples with a closure member (via a stem). The closure member may embody a plug, a ball, a butterfly valve, and/or like implement that can contact a seat to prevent flow. Valve assemblies can also be configured with a sensing mechanism to monitor the position of the closure member. This sensing mechanism can have a position sensor and a mechanical linkage that couples the position sensor with the stem or other structure that moves in concert with the closure member. Valve assemblies can also include a valve positioner that couples with the position sensor. The valve positioner can be configured to regulate instrument gas into the actuator. The instrument gas can pressurize (and depressurize) the actuator in order to locate the closure member in position relative to the seat.

During operation, the valve positioner can receive and process a control signal from a controller that is part of a process control system (also "distributed control system" or "DCS system"). The control signal may define operating parameters for the valve assembly in accordance with an appropriate flow of fluid from the valve assembly and into the process line. The valve positioner can use these operating parameters and the input from the position sensor to regulate the instrument gas to set the position required for the closure member to achieve the appropriate flow.

In process control systems, accuracy of the process devices is critical to achieve appropriate performance of the process line. Valve assemblies are no exception. As noted above, the accuracy of these devices relies, at least in part, on mechanical sensing mechanisms to monitor the position of the closure member. Like all mechanical assemblies, however, values from the sensing mechanism may change during the operating life of the valve assembly on the process line. These changes can introduces certain errors that can frustrate the accuracy of the device.

Accuracy issues do not pervade all types of valve assemblies used in the process control industry. For example, changes in the sensing mechanism are negligible in applications in which the valve assembly and the process control system rely on analog devices and signals. On the other hand, valve assemblies that leverage digital technology (e.g., microprocessors) are more likely susceptible to problems because these valve assemblies often use the input value from the position sensor to calculate the position for the closure member. Thus, any change in the input value has the potential to induce an error in the calculated position.

Unfortunately, there are few opportunities to adjust the sensing mechanism to correct these errors once the process begins on the process line. Many plants and factories restrict access to any process device once the process is operating at its desired parameters. These restrictions are meant to avoid unnecessary disruptions that can lower yields, reduce quality, and result in significant costs and wasted product. In practice, most maintenance occurs during plant shut-downs to avoid the need to take the process line (or any part thereof) down or off-line. Other solutions to correct errors involve "hot swapping" the valve assembly as the process runs, often by locking the position of the closure member and replacing the valve positioner with another valve positioner that is configured to address problems with the mechanical linkage to improve accuracy of the position of the closure member during operation of the valve assembly.

SUMMARY

This disclosure describes methods to correct calibration errors on a valve assembly without disrupting operation of the process line.

A valve assembly can include a valve with a closure member that is configured to move relative to a seat and a valve positioner configured to compare a calculated value to an expected value, each relating to a position of a closure member of the valve assembly relative to a seat of the valve assembly, the calculated value being calculated using a calibration variable and an input value corresponding to a measured position of the closure member. The valve positioner can also be configured to identify a deviation between the calculated value and the expected value. The valve positioner can further be configured to change the calibration variable from a first value to a second value in response to the deviation, the second value equating the calculated value at the input value with the expected value for the position.

The valve assembly can further include a sensor coupled with the valve positioner and configured to generate an input signal that relates to the input value, and wherein the valve positioner can be further configured to compare the calculated value to the expected value to arrive at the deviation.

The valve assembly wherein the valve positioner can be further configured to calculate the deviation in accordance with, $$d = Pos_c - Pos_e,$$

wherein d is the deviation, $Pos_c$ is the calculated value, and $Pos_e$ is the expected value.

The valve assembly wherein the valve positioner can be further configured to determine a drift condition in the input value, wherein the drift condition corresponds to a value for the deviation that satisfies a threshold criteria, and wherein the second value corrects the calculated position that results from the drift condition.

The valve assembly wherein the valve positioner can be further configured to calculate the second value for the second calibration variable in accordance with, $$C_{vnew} = C_{vold} - Pos_c,$$

wherein $C_{vnew}$ is the second value for the calibration variable, $C_{vold}$ is a first value for the calibration variable that is different from the second value $C_{vnew}$, and $Pos_c$ is the calculated position.

The valve assembly wherein the calibration variable comprises a first calibration variable and a second calibration variable, and wherein the second value corresponds to one or more of the first calibration variable and the second calibration variable.

The valve assembly wherein the valve positioner can be further configured to calculate the calculated value according to, $$Pos_c = S_i * C_{v1} + C_{v2},$$

wherein $C_{v1}$ is the first calibration variable and $C_{v2}$ is the second calibration variable, and wherein the second calibration variable $C_{v2}$ assumes the second value The valve assembly wherein the valve positioner can be further configured to calculate the second value for the first calibration variable and the second calibration variable in accordance with, $$C_{v1new} = \frac{C_{v1old}}{(1 - Pos_c)}, \text{ and}$$

$$C_{v2new} = \frac{C_{v2old} - Pos_c}{(1 - Pos_c)},$$

wherein $C_{v1new}$ is the second value for the first calibration variable $Cv_1$, $C_{v1old}$ is a first value for the first calibration variable $C_{v1}$, $C_{v2new}$ is the second value for the second calibration variable Cv2, $C_{v2old}$ is a first value for the second calibration variable $C_{v2}$, and $Pos_c$ is the calculated value.

The valve assembly wherein the valve positioner can be further configured to require an input that acknowledges that the first value is to be different from the second value.

The valve assembly wherein the valve positioner can be further configured to generate an alert in response to the deviation, wherein the alert is configured to solicit the input.

A valve positioner can include a processor, a storage memory coupled with the processor, and executable instructions stored on the storage memory and configured to be executed by the processor. The executable instructions can include instructions for comparing a calculated value to an expected value, each relating to a position of a closure member of the valve assembly relative to a seat of the valve assembly, the calculated value being calculated using a calibration variable and an input value corresponding to a measured position of the closure member. The executable instructions can also include instructions for identifying a deviation between the calculated value and the expected value. The executable instructions can further include instructions for changing the calibration variable from a first value to a second value in response to the deviation, the second value equating the calculated value at the input value with the expected value for the position.

The valve positioner wherein the executable instructions can include instructions for requiring an input that acknowledges that the first value is to be different from the second value.

The valve positioner wherein the executable instructions can include instructions for calculating the second value for the calibration variable in accordance with, $$C_{vnew} = C_{vold} - Pos_c,$$

wherein $C_{vnew}$ is the second value for the calibration variable, $C_{vold}$ is a first value for the vnew calibration variable that is different from the second value $C_{vnew}$, and $Pos_c$ is the calculated position.

The valve positioner wherein the calibration variable can include a first calibration variable and a second calibration variable, and wherein the second value corresponds to one or more of the first calibration variable and the second calibration variable.

The valve positioner wherein the executable instructions can include instructions for calculating the second value for the first calibration variable and the second calibration variable in accordance with, $$C_{v1new} = \frac{C_{v1old}}{(1 - Pos_c)}, \text{ and}$$

$$C_{v2new} = \frac{C_{v2old} - Pos_c}{(1 - Pos_c)},$$

wherein $C_{v1new}$ is the second value for the first calibration variable $Cv_1$, $C_{v1old}$ is a first value for the first calibration variable $C_{v1}$, $C_{v2new}$ is the second value for the second calibration variable Cv2, $C_{v2old}$ is a first value for the second calibration variable $C_{v2}$, and $Pos_c$ is the calculated position.

A method for correcting calibration of a closure member on a valve assembly, said method can include comparing a calculated value to an expected value, each relating to a position of a closure member of the valve assembly relative to a seat of the valve assembly, the calculated value being calculated using a calibration variable and an input value corresponding to a measured position of the closure member. The method can also include identifying a deviation between the calculated value and the expected value. The method can further include changing the calibration variable from a first value to a second value in response to the deviation, the second value equating the calculated value at the input value with the expected value for the position.

The method can further include determining a drift condition in the input value, wherein the drift condition corresponds to a value for the deviation that satisfies a threshold criteria, and wherein the second value corrects the calculated position that results from the drift condition.

The method can further include calculating the calculated value according to, $$Pos_c = S_i \cdot C_{v1} + C_{v2},$$

wherein $Pos_c$ is the calculated value, $C_{v1}$ is a first calibration variable, $C_{v2}$ is a second calibration variable, and $S_i$ is the input value.

The method can further include calculating the second value for the second calibration variable $C_{v2}$ in accordance with, $$C_{vnew} = C_{vold} - Pos_c,$$

wherein $C_{vnew}$ is the second value for the calibration variable, $C_{vold}$ is a first value for the calibration variable that is different from the second value $C_{vnew}$.

The method can further include calculating the second value for the first calibration variable and the second calibration variable in accordance with, $$C_{v1new} = \frac{C_{v1old}}{(1 - Pos_c)}, \text{ and}$$

$$C_{v2new} = \frac{C_{v2old} - Pos_c}{(1 - Pos_c)},$$

wherein $C_{v1new}$ is the second value for the first calibration variable $Cv_1$, $C_{v1old}$ is a first value for the first calibration variable $C_{v1}$, $C_{v2new}$ is the second value for the second calibration variable Cv2, $C_{v2old}$ is a first value for the second calibration variable $C_{v2}$, and $Pos_c$ is the calculated position.

The embodiments contemplated here may be configured to offer at least certain capabilities. These capabilities enable change in one or more calibration variable(s), whether automatically and/or by way of some intervening acknowledgement.

BRIEF DESCRIPTION OF THE DRAWINGS

Reference is now made briefly to the accompanying drawings, in which.

Figure 1:
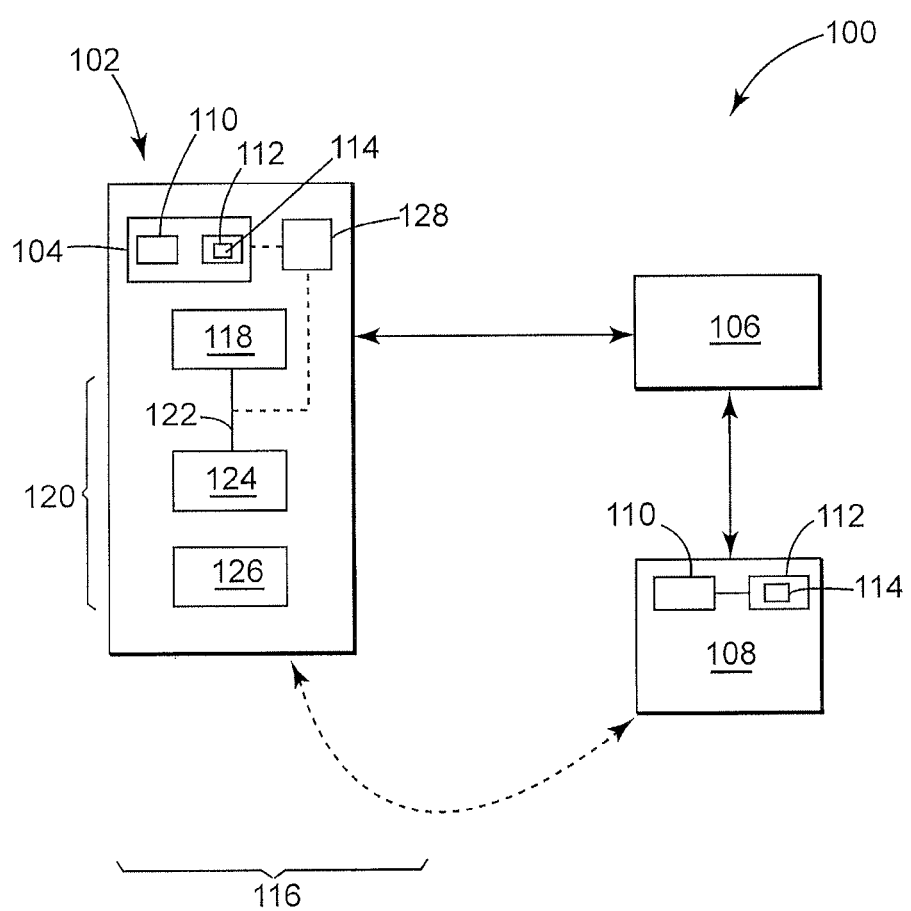
FIG. 1 depicts a schematic diagram of an exemplary embodiment of a system that is configured to automatically correct for errors in an input value from a position sensor on a valve assembly.

Where applicable like reference characters designate identical or corresponding components and units throughout the several views, which are not to scale unless otherwise indicated. Moreover, the embodiments disclosed herein may include elements that appear in one or more of the several views or in combinations of the several views.

DETAILED DESCRIPTION

The discussion below describes embodiments that can correct an error in a calculated position for a closure member of a valve assembly. The correction can occur automatically, even as the valve assembly operates on-line as part of a process line. This feature can avoid unnecessary and/or unwanted operation of the valve assembly, particularly as relates to operating modes (e.g., tight shut-off modes) for the valve assembly contemplated herein. Moreover, by initiating the correction, the embodiments can offer a more accurate fix to the error, while at the same time staving off any need for the plant owner to take the valve assembly off-line to fix the sensing mechanism and to re-calibrate the valve assembly prior to scheduled maintenance on the valve assembly or pre-determined downtime of the process line.

FIG. 1 depicts a schematic diagram of a system 100 that is configured to correct errors in the calculated value for the position of the closure member. The system 100 can include a valve assembly 102 with a valve positioner 104 that can regulate operation of the device. The valve positioner 104 can couple with a process controller 106 that is often part of a larger DCS system, discussed above. The system 100 can also have a management server 108 that communicates with the process controller 106 and, in some cases, with the valve positioner 104. Each of the valve positioner 104 and management server 108 can include a processor 110 and a memory 112. Executable instructions 114 may be stored on the memory 112 in the form of computer programs (e.g., firmware, software, etc.) that configure the respective device to enable certain operations and/or functions. Generally, the structure of the system 100 may allow the process controller 106 to issue commands to the valve positioner 104. The commands may correspond with process parameters on a process line 116. The management server 108 can be configured to retrieve and process data that relates to operation of the valve assembly 102. These processes can generate outputs that are useful to perform device diagnostics that define and identify problematic operation of the valve assembly 102 during use on the process line 116. The management server 108 can be configured to run certain diagnostic and/or operative software and programs for data analysis.

As also shown in FIG. 1, the valve positioner 104 can couple with an actuator 118 to operate a valve 120. The valve 120 can include a stem 122, a closure member 124, and a seat 126. The valve positioner 112 can also couple with a position sensor 128 that can be configured to generate an input signal. Examples of the position sensor 128 can include proximity sensors, transducers (e.g., Hall Effect sensors), and like devices.

As noted herein, the valve assembly 102 may also include a mechanical linkage that couples the positioner sensor 128 with the valve 120. The mechanical linkage may incorporate various components (e.g., arms, joints, etc.) that move (e.g., translate, rotate, etc.) in response to movement of the valve 120 to trigger the input signal (or, generally, a response) from the position sensor 128. In one implementation, the input signal identifies an input value that relates to the position of the closure member 124. The valve positioner 104 can use the input value from the position sensor 128 to modulate operation of the actuator 118, which in turn can regulate the position of the closure member 124 relative to the seat 126. The position of the closure member 124 can maintain appropriate flow of process fluid in accordance with the process parameters from the process controller 106.

Broadly, the system 100 can recognize and correct the position of the closure member 124 in the event of drift or the presence of a drift condition that occurs in (or is detected using) the input value from the position sensor 128. Such conditions are often the result of loose and/or failing components of the mechanical linkage. In one implementation, the system 100 can change a value for one or more variables (also "calibration variables") that the system 100 uses to regulate the closure member 124 to the appropriate position. Initial values for these calibration variables can be stored prior to use and/or commissioning of the valve assembly 102 on the process line 116. In one example, the system 100 can use the value for the calibration variable(s) and the input value from the position sensor 128 to calculate the position of the closure member 124.

The changes in the calibration variable(s) can update the value from a first value to a second value that comports with the new (or "drifted") input value from the position sensor 128. This update may occur automatically, e.g., in response to detection of the drift and/or drift condition. In one implementation, the update may occur manually such as by using a computing device (e.g., laptop) that couples with the valve assembly 102 to upload the second value, as desired. Other implementations may allow and/or require the plant owner to confirm the change from the first value to the second value. In one implementation, the update may require an external stimulus and/or like "acknowledgement" before changing the first value to the second value (or, as noted more below, indicating that the second value is to be different than the first value). The external stimuli may embody an input from an end user; for example, the system 100 may be configured to solicit the input from the end user with an icon on a user interface displayed on a computing device. In other examples, the system 100 may be configured to execute processes to identify the relative position between the second value and a certain threshold and/or operating criteria, wherein the system 100 is configured to complete the update in response to the deviation or relative position.

The system 100 can store the values for the calibration variable(s) across one or more components. The first value for the calibration variable(s) may be stored in memory 112 on-board the valve positioner 104. The system 100 can also be configured to store the second value for the calibration variable(s) in the memory 112 on-board the valve positioner 104. These configurations may replace or overwrite the first value (also "previously-stored value") for the calibration variable(s) already stored thereon. This disclosure also contemplates configurations of the system 100 in which the calibration variable(s) can be found on memory 112 of the management server 108 and/or other storage medium remote from the valve positioner 104.

Figure 2:
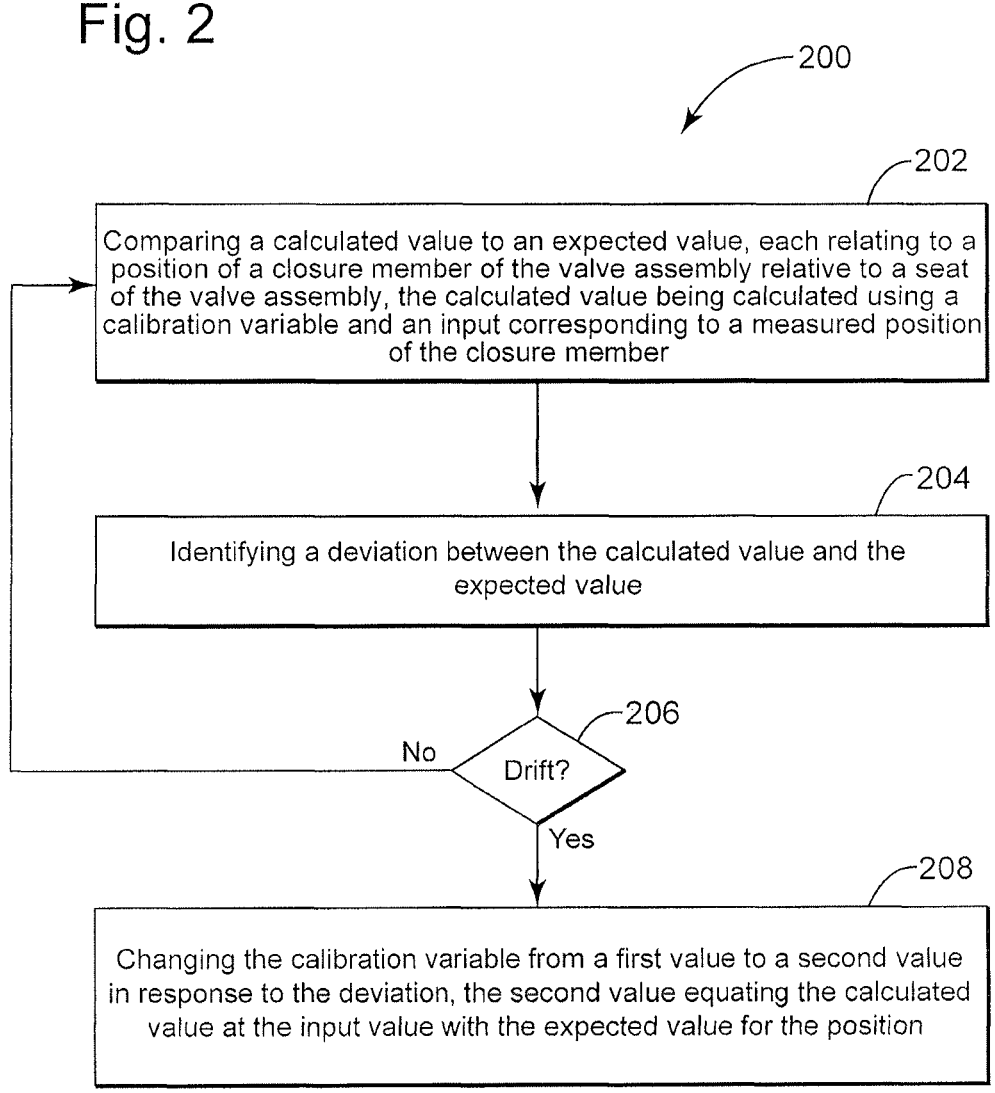
FIG. 2 depicts a flow diagram of an exemplary embodiment of a method for updating calibration variable(s) to correct the error in the position of the closure member.

FIG. 2 illustrates a flow diagram of a method 200 for updating the calibration variable(s) to correct the error in the position of the closure member. The method 200 is exemplary only and can be modified by, for example, reordering, adding, removing, and/or altering the individual stages.

The method 200 includes, at stage 202, comparing a calculated value to an expected value, each relating to a position of a closure member of the valve assembly relative to a seat of the valve assembly, the calculated value being calculated using a calibration variable and an input (also, "input value") corresponding to a measured position of the closure member. The method 200 also includes, at stage 204, identifying a deviation between the calculated value and the expected value and, at stage 206, using the deviation, determining whether drifting of the input value has occurred. If the input value has not drifted, then the method 200 can continue at stage 202. On the other hand if the value has drifted, then the method 200 can continue to include, at stage 208, changing the calibration variable from a first value to a second value in response to the deviation, the second value equating the calculated value at the input value with the expected value for the position of the closure member.

At stage 202, the method 200 compares the calculated value (also, "calculated position") to the expected value (also "expected position") for the position of the closure member 124 relative to the seat 126. The expected position of the closure member 124 can be the position required to achieve the process parameters and, thus, may vary across the travel of the closure member 124. In one implementation, this position may comprise one or more of a fully-closed position, which occurs with the closure member 124 in contact with the seat 126, and a fully-open position that occurs with the closure member 124 at a position furthest from the seat 126. Units for the position (and, also, the expected position and the calculated position) may be identified as a percentage (e.g., x %), where 0% corresponds with the fully-closed position for the closure member 124 and 100% corresponds with the fully-opened position for the closure member 124.

At stage 204, the method 200 identifies a deviation between the calculated position and the expected position for the closure member 124. To facilitate this stage, the method 200 may also include one or more stages for comparing the calculated position to the expected position and, further, one or more stages for calculating the deviation and storing the deviation in a repository (e.g., memory 112 of FIG. 1).

In some embodiments, the deviation relates to a relationship between the calculated position and the expected position of the closure member 124. This relationship may embody a numerical quantity (e.g., +2, −3, etc.). The numerical quantity can be calculated in accordance with Equation (1) below:

$$d = Pos_c - Pos_e,$$ Equation (1)

wherein d is the deviation, $Pos_c$ is the calculated position, and $Pos_e$ is the expected position. In other implementations, the deviation d may represent a relative position (e.g., greater than, less than, equal to, etc.) between the calculated position $Pos_c$ and the expected position $Pos_e$ of the closure member. The method 200 may, in turn, include stages for assigning a binary value to the deviation d in accordance with the relative position (e.g., the value is 1 when the calculated position is greater than the expected position, the value is −1 when the calculated position is less than the expected position, etc.). In use, the method 200 may further include stages for aggregating this binary value and using the aggregated value as a trigger for changing the value for the calibration variable in accordance with this disclosure.

At stage 206, the method 200 determines the drift and/or the presences of the drift condition in the input value during operation of the valve assembly. Generally, the drift condition indicates that the input value from the position sensor 128 has changed, e.g., from a first input value to a second input value. The method 200 may include, for example, one or more stages for comparing the deviation d or the aggregated value of the deviation d to a threshold criteria (e.g., a number or integer). This threshold criteria can have a pre-determined value that is set to regulate operation of the method 200 to modify the calibration variable. If the deviation d and/or the aggregate value satisfies the threshold criteria (e.g., is greater than, less than, not equal to, equal to, etc.), then the method 200 can continue (at further stages) to modify the calibration variable.

In some examples, the method 200 may include one or more stages that configure the system 100 for generating an alert of suitable composition (e.g., a message, an audible sound, etc.) that indicates the problems with the sensing mechanism on the valve assembly. This alert may be directed at the end user (e.g., a plant operator); for example, the alert may operate as an input to a collateral software program that the end user utilizes to manage plant operation and/or device diagnostics. The input may cause the collateral software program to modify a user interface to solicit action (e.g., an input) by the end user. As noted above, examples of the alert may require or solicit the end user to authorize further execution of the method 200 to update the calibration variable, e.g., from the first value to the second value. In other examples, the alert may require the end user to interface with the valve assembly in some manner to update and/or perform maintenance to update the calibration variable(s) and/or remediate the accuracy issues.

At stage 208, the method 200 changes the calibration variable from the first or initial value to the second or modified value in response to the deviation d. The second value can be configured to accommodate for the drift condition and/or the detected change in the input value from the position sensor 128. As noted above, the method 200 may be configured with stages to change the calibration variable automatically. In other embodiments, the method 200 may include one or more stages for requiring an input that acknowledges the change in the value of the calibration variable (from the first value to the second value) or requiring an input that acknowledges that the second value is to be different from the first value. These stages may coincide with the alert, mentioned above, wherein the alert solicits the input from the plant owner to acknowledge the change in the calibration variable.

The second value can equate the calculated value $Pos_c$ of the closure member 124 at the input value with the expected value $Pos_e$ of the closure member 124. At the fully-closed position of the closure member 124, for example, the second value is configured so that the calculated position $Pos_c$ is 0% using the input value from the position sensor 128. For the fully-opened position of the closure member 124, the second value can be configured so that the calculated position $Pos_c$ is 100% using the input value from the position sensor 128.

The method 200 may include one or more stages for determining the calculated value $Pos_c$ of the position of the closure member 124 relative to the seat 126. These stages may implement Equation (2) below:

$$Pos_c = S_i * C_{v1} + C_{v2} \qquad \text{Equation (2)}$$

wherein $C_{v1}$ is a first calibration variable, $C_{v2}$ is a second calibration variable, and $S_i$ is the input value from the position sensor 128. Because the input value $S_i$ may correspond with an electrical signal from the position sensor 128, the method 200 may include one or more stages for receiving the electrical signal from the position sensor 128 and, where necessary, processing the electrical signal to determine the input value $S_i$. In other implementations, the method 100 may include one or more stages for retrieving the input value $S_i$ from a repository (e.g., the memory 112 of the valve positioner 104 or the memory 112 on the management server 108).

The method 200 may be configured with stages to calculate the values for the first calibration variable $C_{v1}$ and the second calibration variable $C_{v2}$. In connection with the discussion above, these values may correspond with the position of the closure member 124 relative to the seat 126 (e.g., whether the closure member 124 is in the fully-closed position or the fully-opened position). In one implementation, the stages may formulate the values for the calibration variable $C_{v1}$, $C_{v2}$ to satisfy Equation (3) (with the closure member 124 in the fully-closed position) and/or Equation (4) (with the closure member 124 in the fully-opened position) below:

$$C_{v1} * S_{i1} + C_{v2} = 0, \qquad \text{Equation (3)}$$

$$C_{v1} * S_{i2} + C_{v2} = 1, \qquad \text{Equation (4)}$$

wherein $S_{i1}$ is a first initialized value for the position of the closure member and $S_{i2}$ is a second initialized value for the position of the closure member 124. The initialized values $S_{i1}$, $S_{i2}$ may be assigned and stored prior to operation of the valve assembly 102 on the process line 110. Thus, the method 200 may include stages that configure the system 100 for retrieving the initialized values $S_{i1}$, $S_{i2}$ in connection with implementation of Equations (3) and (4), as necessary.

Assigning the initialized values $S_{i1}$, $S_{i2}$ may require an initializing or calibration process (prior to installation on the process line 112) to align the input value from the position sensor 128 with the actual position of the closure member 124. In one example, the process to initialize the valve assembly 102 can fully exhaust and fully pressurize the actuator 118 to achieve these positions. Depending on the operation of the valve assembly 102 as air-to-open or air-to-close, this exercise can position the closure member 124 at either its fully-closed position or its fully-open position. For air-to-open configurations of the valve assembly 102, the initialization process can associate the first initialized value $S_{i1}$ (also, "first input value" or "low input value") with the input value from the position sensor 128 that corresponds to the closure member 124 in its fully-closed position and the second initialized value $S_{i2}$ (also, "second input value" or "high input value") with the input value from the position sensor 128 that corresponds to the closure member 124 in its fully-opened position. In air-to-close configurations of the valve assembly, the initialization process can associate the first initialized value $S_{i1}$ with the input value from the position sensor 128 that correspond with the closure member 124 in its fully-open position and the second initialized value $S_{i2}$ with the input value from the position sensor 128 that corresponds with the closure member 124 in its fully-closed position.

In the field, various operating issues may cause the input value from the position sensor 128 to drift away from the initialized values $S_{i1}$ and $S_{i2}$. For example, the mechanical linkage that couples the position sensor 128 with the valve 120 can become loose. These problems can result in the drift condition, which, in turn, can cause the error in the calculated position set by the valve positioner 104 during operation of the valve assembly 102.

Use of the method 200 can be particularly beneficial to remediate errors proximate the fully-closed position because this position can be more sensitive to drift in the input value from the position sensor 128. Errors in the calculated position may have little effect when the valve assembly 102 locates the closure member 124 in the mid-range between the fully-closed position and the fully-opened position because the DCS system can vary the control signal for the valve positioner to modulate the closure member to the correct position. On the other hand, the error may become much more profound when the valve positioner 104 sets the position for the closure member 124 very close to the seat 126. At this close proximity, for example, introducing even a 1% error into the calculated position of the closure member 124 can mean the closure member 124 is off by over 25% as compared to the expected position (e.g., 2%).

Such errors in the calculated position may become problematic during certain modes of operation of the valve assembly 102. In tight shut-off mode, for example, the valve positioner 104 is configured to move the closure member 124 to the closed position in response to all commanded positions that are below a certain threshold. If the threshold for tight shut-off is 10%, for example, then the valve positioner 104 will attempt to close the valve 120 for commanded positions below 10% and operate as normal for commanded positions above 10%. Errors in the calculated position of the closure member 124 may indicate that the closure member 124 is closer to the seat 126 than it actually is and, thus, any command signals that instruct a position for the closure member 124 that is very near, but not within, the threshold levels can inadvertently trigger the tight shut-off mode. In certain circumstances, the DCS system may continue to deliver command signals that cause the valve assembly 102 to repeatedly cycle the closure member 124 into and out of the closed position because the DCS system is often not "aware" that the valve assembly 102 is configured to implement the tight shut-off mode.

Referring back to FIGS. 1 and 2, the method 200 may be configured to address different sources of the error in the input value from the position sensor 128. The method 200 may include one or more stages for calculating the second value for one or both of the calibration variables $C_{v1}$, $C_{v2}$. In one implementation, the stages may change the second calibration value $C_{v2}$ because the source of the error is due to changes in the position of the mechanical linkage relative to the position sensor 128. The stages may include stages that change the value of the second calibration value $C_{v2}$ in accordance with Equation (5) below:

$$C_{v2new} = C_{v2old} - Pos_c, \qquad \text{Equation (5)}$$

wherein $C_{v2new}$ is the second (or new) value for the second calibration variable $C_{v2}$, $C_{v2old}$ is the first (or old) value (also "previously-stored value") for the second calibration variable $C_{v2}$, and $Pos_c$ is the calculated position at the input value from the position sensor 128.

In other implementations, the stages may change both the first calibration variable $C_{v1}$ and the second calibration variable $C_{v2}$ because the source of the errors is due to changes in the length of the mechanical linkage. These changes may result from loosening of connections in the mechanical linkage that can cause different translation of the mechanical linkage relative to the position sensor. In one implementation, to accommodate for a change in length, the stages may include stages to change the value of the first calibration value $C_{v1}$ and the value of the second calibration value $C_{v2}$ in accordance with Equations (6) and (7) below:

$$C_{v1new} = \frac{C_{v1old}}{(1 - Pos_c)}, \quad \text{Equation (6)}$$

$$C_{v2new} = \frac{C_{v2old} - Pos_c}{(1 - Pos_c)}, \quad \text{Equation (7)}$$

wherein $C_{v1new}$ is the second (or new) value for the first calibration variable $Cv_1$ and $C_{v1old}$ is the first (or old) value (also "previously-stored value") for the first calibration variable $C_{v1}$. The method 200 may also include one or more stages for storing the second value $C_{v1new}$ and/or the second value $C_{v2new}$ in a repository and/or, for example, writing one or more of the second value $C_{v1new}$ and the second value $C_{v2new}$ over the first value $C_{v1old}$ and the second value $C_{v2old}$ for the calibration variables $C_{v1}$, $C_{v2}$.

Implementation of the method 200 and its embodiments may configure particular components of the system 100 for particular functionality useful to automatically update the calibration variable. The valve positioner 104, for example, may implement all of the stages of the method 200 and can provide the necessary calibration adjustments on-board the valve assembly. In one implementation, the management server 108 may be configured to implement the embodiments; in such configuration, the management server 108 may provide a control signal (also, "input") to the valve positioner 104 that comprises data that relates to the change in the calibration parameter and/or that instructs the valve positioner 104 to update the calibration variable, as desired. In other implementations, the valve positioner 104 and the management server 108, together and/or in combination with other components of the system 100, can be configured to implement the stages contemplated herein to update the calibration variable(s).

Figure 3:
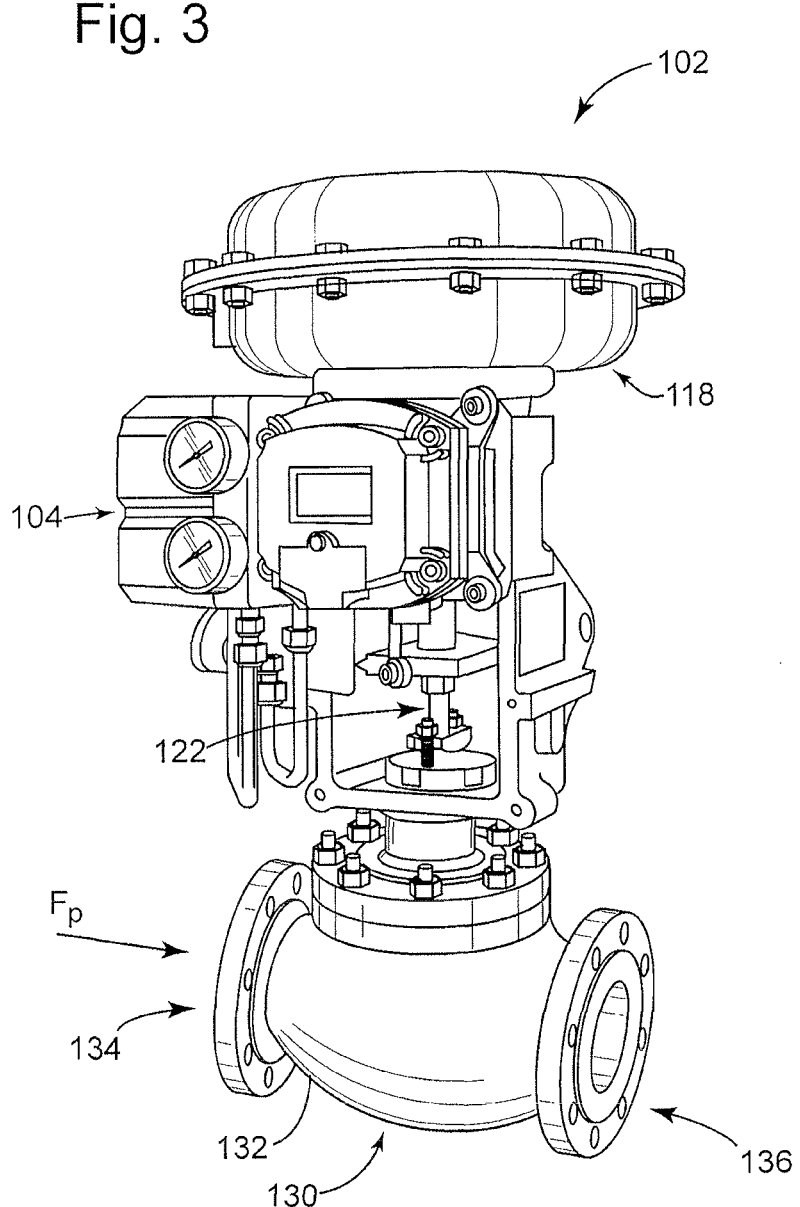
FIG. 3 depicts a perspective view of an example of the valve assembly of FIG. 1.
Figure 4:
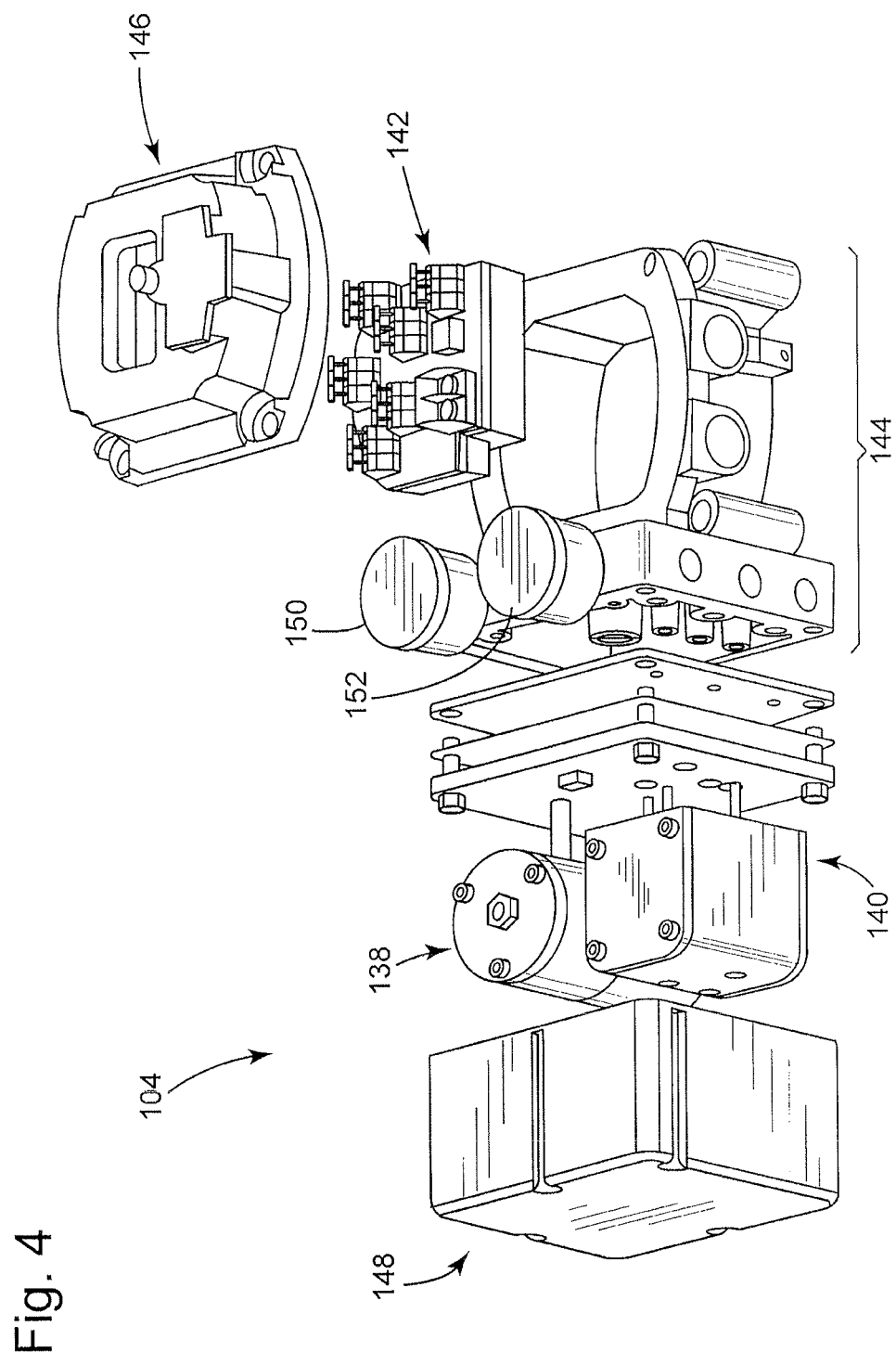
FIG. 4 depicts an exploded assembly view of a valve positioner on the valve assembly of FIG. 3.
Figure 5:
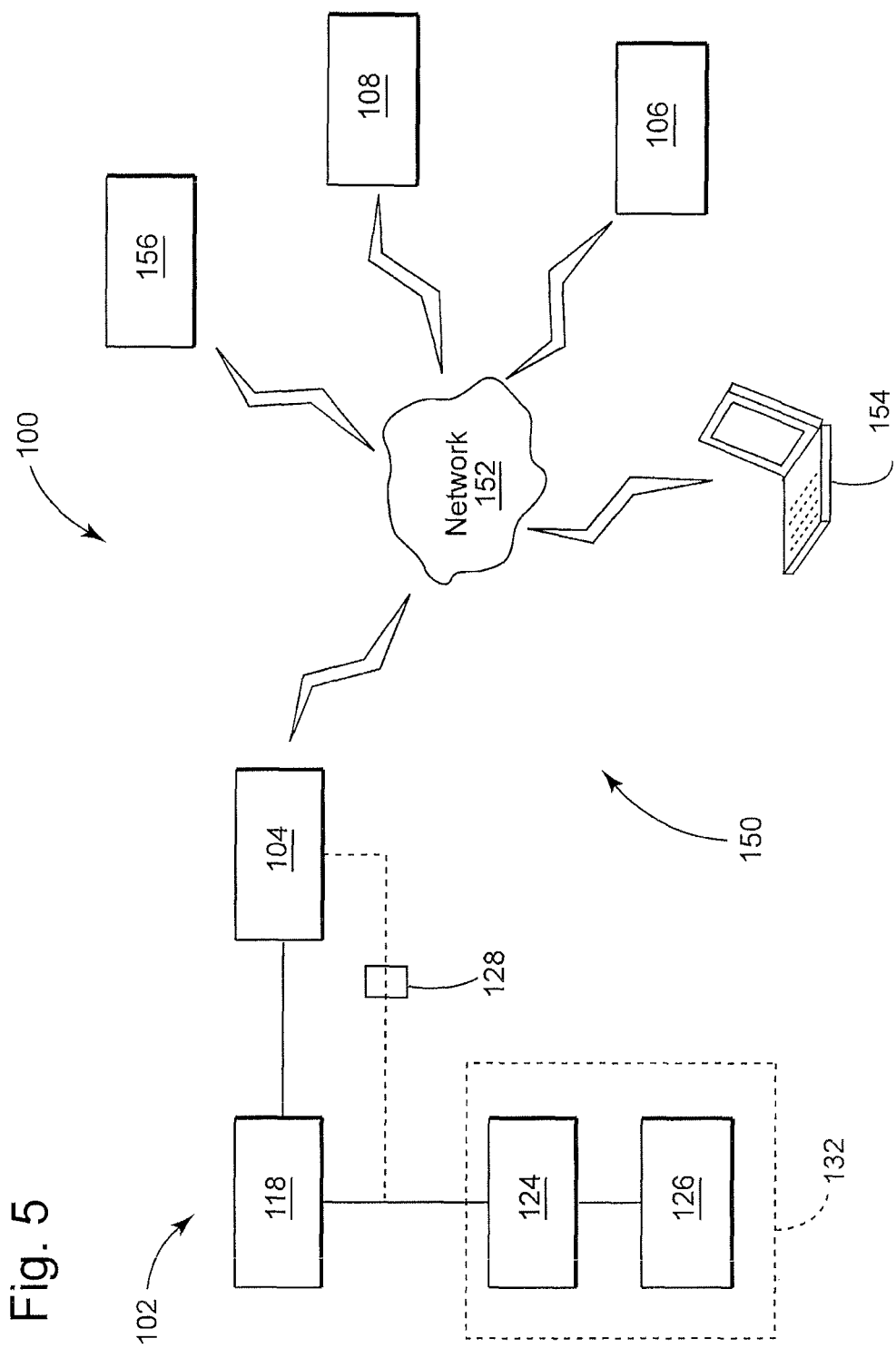
FIG. 5 depicts a schematic diagram of an example of the system of FIG. 1.

FIGS. 3, 4, and 5 depict an example of a valve assembly 102 (FIGS. 3 and 4) and a system 100 (FIG. 5) that can employ the embodiments disclosed herein. These examples can be useful to regulate process fluids in industrial process lines typical of industries that focus on chemical production, refining production, and resource extraction. FIG. 3 shows a perspective view of the exemplary valve assembly. FIG. 4 provides an exploded assembly view of components of the valve positioner. FIG. 5 illustrates a schematic diagram of the valve assembly as part of a process control system.

In FIG. 3, the valve assembly 102 can include a fluid coupling 130 with a body 132 that has a first inlet/outlet 134 and a second inlet/outlet 136. The fluid coupling 130 can include components of the valve in the interior to the body 132 and, thus, these components (e.g., the closure member 124 and the seat 126 of FIG. 1) are not shown in the present view. This structure can modulate a flow of process fluid $F_P$ between the inlet/outlets 134, 136.

With reference also to FIG. 3, FIG. 4 depicts the valve positioner 104 in exploded form. As noted above, the valve positioner 104 can have components that generate the pneumatic signal to the actuator 118. The valve positioner 104 can have a plurality of positioner components (e.g., a converter component 138, a relay component 140, and a processing component 142). The valve positioner 104 can also have a housing 144. One or more covers (e.g., a first cover 146 and a second cover 148) can secure with the housing 144 to form an enclosure about the positioner components 138, 140, 142. This enclosure can protect the positioner components from conditions that prevail in the environment surrounding the valve assembly 102. The valve positioner 104 can also include one or more gauges (e.g., a first gauge 150 and a second gauge 152) that can provide an indication of the flow conditions (e.g., pressure, flow rate, etc.) of the instrument gas that the valve positioner 104 uses to operate the valve in the valve assembly 102. In one example, operation of the positioner components 138, 140, 142 can maintain the position of the valve members in the body 130 to modulate flow of the process fluid $F_P$ across the inlet/outlets 134, 132.

FIG. 5 depicts a schematic diagram of the system 100. In this example, the system 100 can include a network system 150 that includes a network 152. Examples of the network 152 can transfer data, information, and signals by way of wired protocols (e.g., 4-20 mA, FOUNDATION® Fieldbus, HART® etc.) and/or wireless protocols, many of which find use in a plant or factory automation environment. These protocols may facilitate communication over the network 152 between the valve positioner 104, the process controller 106, the management server 108, a terminal 154, and/or an external server 156. During operation, the process controller 106 can execute one or more computer programs to deliver a command signal to the valve positioner 104. The command signal may identify a commanded position for the closure member 124. The valve positioner 104 can use the commanded position to modulate the instrument gas to the actuator 118 and, effectively, allow the closure member 124 to move relative to the seat 126. As noted herein, feedback in the assembly from the position sensor 128 can provide the valve positioner 104 with the position of the valve stem 122. This position corresponds with the location and/or position of the closure member 124 relative to the seat 126.

Data may reside on a data source, often locally in one or more memories on the valve positioner 104, although this disclosure also contemplates configurations in which the data resides on the system 100. For example, the data source may integrate with the management server 108 and/or as part of the external server 156. At the data source, the data may be arranged as one or more data sets that include one or more data samples. The data sets may be identified by an indicator (e.g., a date stamp, a time stamp, a date/time stamp, etc.) that relates to the chronological time at which the data samples in the data set were gathered and/or stored, e.g., in memory. For real-time use of the methods, the data samples may be read into a buffer and/or like configured storage medium that allows for ready access to the data samples to afford the methods with chronologically relevant data, taking into consideration necessary data processing time-lag. In one embodiment, the methods may include one or more stages for obtaining and/or retrieving the data from the data source.

In view of the foregoing, the embodiments herein can deploy features that can automatically correct for errors in the calculated position of the closure member relative to the seat. These errors are likely induced by drift, in the input value of the positioner sensor. At least one exemplary technical effect is to maintain the accuracy of the valve assembly to locate the closure member relative to the seat, particularly as compared to the expected position of the closure member at the fully-closed position and/or the fully-opened position, and, thus, avoid unnecessary repairs and maintenance on the valve assembly on the process line.

The embodiments may be implemented on any device where relevant data is present and/or otherwise accessible. For example, the embodiments can be implemented as executable instructions (e.g., firmware, hardware, software, etc.) on the valve positioner. The valve positioner can transmit the output of the embodiments to a distributed control system, asset management system, independent monitoring computing device (e.g., a desktop computer, laptop computer, tablet, smartphone, mobile device, etc.). In another embodiment, the embodiments can obtain data from a historian (e.g., a repository, memory, etc.), and send to an independent diagnostic computing device. The historian is conventionally connected to the asset management system or distributed control system. The diagnostic computing device has all the capabilities of the monitoring computer and, often, the additional capability to execute executable instructions for the embodiment to process the given data. In another embodiment, the valve positioner is configured to send data by wires or wirelessly to the diagnostic computing device, as well as through peripheral and complimentary channels (e.g., through intermediate devices such as a DCS or may be connected directly to the diagnostic computer).

One or more of the stages of the methods can be coded as one or more executable instructions (e.g., hardware, firmware, software, software programs, etc.). These executable instructions can be part of a computer-implemented method and/or program, which can be executed by a processor and/or processing device. The processor may be configured to execute these executable instructions, as well as to process inputs and to generate outputs, as set forth herein. For example, the software can run on the process device, the diagnostics server, and/or as software, application, or other aggregation of executable instructions on a separate computer, tablet, laptop, smart phone, wearable device, and like computing device. These devices can display the user interface (also, a "graphical user interface") that allows the end user to interact with the software to view and input information and data as contemplated herein.

The computing components (e.g., memory and processor) can embody hardware that incorporates with other hardware (e.g., circuitry) to form a unitary and/or monolithic unit devised to execute computer programs and/or executable instructions (e.g., in the form of firmware and software). Exemplary circuits of this type include discrete elements such as resistors, transistors, diodes, switches, and capacitors. Examples of a processor include microprocessors and other logic devices such as field programmable gate arrays ("FPGAs") and application specific integrated circuits ("ASICs"). Memory includes volatile and non-volatile memory and can store executable instructions in the form of and/or including software (or firmware) instructions and configuration settings. Although all of the discrete elements, circuits, and devices function individually in a manner that is generally understood by those artisans that have ordinary skill in the electrical arts, it is their combination and integration into functional electrical groups and circuits that generally provide for the concepts that are disclosed and described herein.

Aspects of the present disclosure may be embodied as a system, method, or computer program product. The embodiments may take the form of an entirely hardware embodiment, an entirely software embodiment (including firmware, software, etc.) or an embodiment combining software and hardware aspects that may all generally be referred to herein as a "circuit," "module" or "system." The computer program product may embody one or more non-transitory computer readable medium(s) having computer readable program code embodied thereon.

Computer program code for carrying out operations for aspects of the disclosed subject matter may be written in any combination of one or more programming languages, including an object oriented programming language and conventional procedural programming languages. Program code embodied on a computer readable medium may be transmitted using any appropriate medium, including but not limited to wireless, wireline, optical fiber cable, RF, etc., or any suitable combination of the foregoing.

As used herein, an element or function recited in the singular and proceeded with the word "a" or "an" should be understood as not excluding plural said elements or functions, unless such exclusion is explicitly recited. Furthermore, references to "one embodiment" of the disclosed subject matter should not be interpreted as excluding the existence of additional embodiments that also incorporate the recited features.

This written description uses examples to disclose the subject matter, including the best mode, and also to enable any person skilled in the art to practice the disclosed subject matter, including making and using any devices or systems and performing any incorporated methods. The patentable scope of the disclosed subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A valve assembly, comprising:
a valve comprising a closure member that is configured to move relative to a seat; and
a valve positioner configured to,
compare a calculated value to an expected value that define a position of the closure member of the valve assembly relative to the seat of the valve assembly, the calculated value being calculated using a calibration variable and an input value corresponding to a measured position of the closure member, wherein the calibration variable comprises a first calibration variable and a second calibration variable, and wherein the second value corresponds to one or more of the first calibration variable and the second calibration variable;
identify a deviation between the calculated value and the expected value;
change the calibration variable from a first value to a second value in response to the deviation, the second value equating the calculated value at the input value with the expected value for the position of the closure member relative to the seat in the valve assembly,
calculate the second value for the first calibration variable and the second calibration variable in accordance with, $$C_{v1new} = \frac{C_{v1old}}{(1 - Pos_c)}, \text{ and}$$

-continued $$C_{v2new} = \frac{C_{v2old} - Pos_c}{(1 - Pos_c)}, \text{ and}$$

generate a pneumatic signal to move the closure member to the calculated value for the position of the closure member relative to the seat that corresponds with the second value,
wherein $C_{v1new}$ is the second value for the first calibration variable $Cv_1$, $C_{v1old}$ is a first value for the first calibration variable $C_{v1}$, $C_{v2new}$ is the second value for the second calibration variable $Cv2$, $C_{v2old}$ is a first value for the second calibration variable $C_{v2}$, and $Pos_c$ is the calculated value.

2. The valve assembly of claim 1, wherein the valve positioner is further configured to compare the calculated value to the expected value to arrive at the deviation.

3. The valve assembly of claim 1, wherein the valve positioner is further configured to,
calculate the deviation in accordance with, $$d = Pos_c - Pos_e,$$

wherein d is the deviation, $Pos_c$ is the calculated value, and $Pos_e$ is the expected value.

4. The valve assembly of claim 1, wherein the valve positioner is further configured to,
determine a drift condition in the input value, wherein the drift condition corresponds to a value for the deviation that satisfies a threshold criteria, and wherein the second value corrects the calculated position that results from the drift condition.

5. The valve assembly of claim 1, wherein the valve positioner is further configured to,
calculate the second value for the second calibration variable in accordance with, $$C_{vnew} = C_{vold} - Pos_c,$$

wherein $C_{vnew}$ is the second value for the calibration variable, $C_{vold}$ is a first value for the calibration variable that is different from the second value $C_{vnew}$, and $Pos_c$ is the calculated value.

6. The valve assembly of claim 1, further comprising a sensor coupled with the valve positioner and configured to generate an input signal that relates to the input value,
wherein the valve positioner is further configured to,
calculate the calculated value according to, $$Pos_c = S_i * C_{v1} + C_{v2},$$

wherein $S_i$ is the input value from the sensor, $C_{v1}$ is the first calibration variable, and $C_{v2}$ is the second calibration variable, and
wherein the second calibration variable $C_{v2}$ assumes the second value.

7. The valve assembly of claim 1, wherein the valve positioner is further configured to,
require an input that acknowledges that the first value is to be different from the second value.

8. The valve assembly of claim 7, wherein the valve positioner is further configured to,
generate an alert in response to the deviation, wherein the alert is configured to solicit the input.

9. A valve positioner, comprising:
a processor;
a storage memory coupled with the processor; and
executable instructions stored on the storage memory and configured to be executed by the processor, the executable instructions comprising instructions for,
comparing a calculated value to an expected value that define a position of the closure member of the valve assembly relative to the seat of the valve assembly, the calculated value being calculated using a calibration variable and an input value corresponding to a measured position of the closure member, wherein the calibration variable comprises a first calibration variable and a second calibration variable, and wherein the second value corresponds to one or more of the first calibration variable and the second calibration variable;
identifying a deviation between the calculated value and the expected value; and
changing the calibration variable from a first value to a second value in response to the deviation, the second value equating the calculated value at the input value with the expected value for the position by calculating the second value for the first calibration variable and the second calibration variable in accordance with, $$C_{v1new} = \frac{C_{v1old}}{(1 - Pos_c)}, \text{ and}$$

$$C_{v2new} = \frac{C_{v2old} - Pos_c}{(1 - Pos_c)},$$

generate a pneumatic signal to move the closure member to the calculated value for the position of the closure member relative to the seat that corresponds with the second value,
wherein $C_{v1new}$ is the second value for the first calibration variable $Cv_1$, $C_{v1old}$ is a first value for the first calibration variable $C_{v1}$, $C_{v2new}$ is the second value for the second calibration variable $Cv2$, $C_{v2old}$ is a first value for the second calibration variable $C_{v2}$, and $Pos_c$ is the calculated position.

10. The valve positioner of claim 9, wherein the executable instructions comprise one or more instructions for,
requiring an input that acknowledges that the first value is to be different from the second value.

11. The valve positioner of claim 9, wherein the executable instructions include instructions for,
calculating the second value for the calibration variable in accordance with, $$C_{vnew} = C_{vold} - Pos_c,$$

wherein $C_{vnew}$ is the second value for the calibration variable, $C_{vold}$ is a first value for the calibration variable that is different from the second value $C_{vnew}$, and $Pos_c$ is the calculated position.

12. A method, comprising:
comparing a calculated value to an expected value that define a position of the closure member of the valve assembly relative to the seat of the valve assembly, the calculated value being calculated using a calibration variable and an input value corresponding to a measured position of the closure member;
identifying a deviation between the calculated value and the expected value; and
changing the calibration variable from a first value to a second value in response to the deviation, the second value equating the calculated value at the input value with the expected value for the position calculating the second value for the first calibration variable and the second calibration variable in accordance with, $$C_{v1new} = \frac{C_{v1old}}{(1 - Pos_c)}, \text{ and}$$

$$C_{v2new} = \frac{C_{v2old} - Pos_c}{(1 - Pos_c)},$$

calculating the calculated value according to, $$Pos_c = S_i * C_{v1} + C_{v2}, \text{ and}$$

generating a pneumatic signal to move the closure member to the calculated value for the position of the closure member relative to the seat that corresponds to the second value, wherein $Pos_c$ is the calculated value, $C_{v1}$ is a first calibration variable, $C_{v2}$ is a second calibration variable, and $S_i$ is the input value, and wherein $C_{v1new}$ is the second value for the first calibration variable $Cv_1$, $C_{v1old}$ is a first value for the first calibration variable $C_{v1}$, $C_{v2new}$ is the second value for the second calibration variable $Cv2$, $C_{v2old}$ is a first value for the second calibration variable $C_{v2}$, and $Pos_c$ is the calculated position.

13. The method of claim 12, further comprising:
determining a drift condition in the input value, wherein the drift condition corresponds to a value for the deviation that satisfies a threshold criteria, and wherein the second value corrects the calculated position that results from the drift condition.

14. The method of claim 12, further comprising:
calculating the second value for the second calibration variable $C_{v2}$ in accordance with, $$C_{vnew} = C_{vold} - Pos_c,$$

wherein $C_{vnew}$ is the second value for the calibration variable, $C_{vold}$ is a first value for the calibration variable that is different from the second value $C_{vnew}$.

* * * * *